Patented Aug. 11, 1953

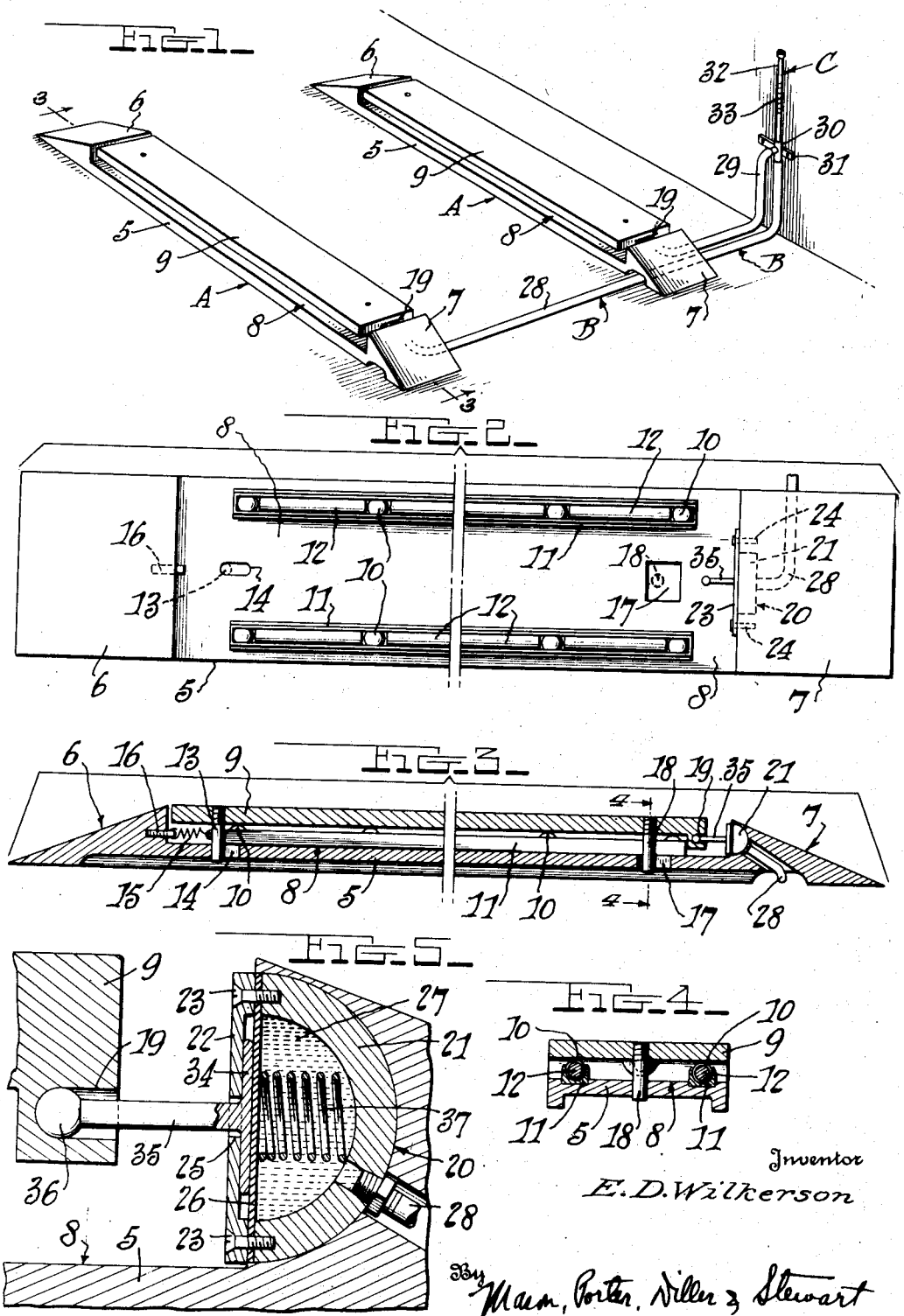

2,648,140

UNITED STATES PATENT OFFICE 2,648,140

SCUFF BOARD FOR TESTING AUTOMOBILE WHEEL ALIGNMENT

Edward D. Wilkerson, Orange, N. J.

Application January 16, 1950, Serial No. 138,752

8 Claims. (Cl. 33—203.14)

The invention relates generally to apparatus for testing automobile wheel alignment and primarily seeks to provide novel scuff board structures preferably used in pairs and onto which automobile wheels may be moved to determine wheel misalignment by lateral or forward scuff deflection or displacement of wheel supporting board portions.

Scuff boards have been available for use in testing wheel alignment heretofore, but those of which I have knowledge have met with only partial success because in them provision was made for detecting misalignment of wheels only by lateral scuff deflection of wheel supporting members, and it is well known that testing devices so limited will not meet essential requirements of proper wheel alignment testing. Unless such devices have provision for indicating forward deflection or displacement of the wheel supporting members, as well as lateral displacement thereof, accurate and reliable testing cannot be accomplished. It is a purpose of the present invention to provide an apparatus of the character stated wherein provision is made for indicating forward deflection or displacement of wheel supporting members, as well as lateral deflection or displacement as an indication of improper alignment of the supported wheels. The importance of this provision, or rather the necessity thereof will be better appreciated when it is explained that there are times when camber and caster may be so related as to balance out and present only a forward thrust on a scuff board, and in such cases the devices of the mentioned known art would be worthless in detecting off alignment because of the impossibility of detecting other than lateral deflection.

In the conventional camber setting of automobile wheels, the wheels are tilted outwardly and have a tendency to roll outwardly away from each other, or to one side or the other way from the automobile. Since the wheels are constrained against this tendency by their mountings, this camber urge creates a tension or stiffness between the steering wheels of the automobile which gives the car stability to stay in a set line. It is also well known that in addition to this camber angle, the steering wheels of an automobile have what is known as toe-in. This toe-in is primarily used to offset the tendency of the wheels to spread out at high speeds, and the effect is to cause the wheels to roll at zero toe-in at a predetermined high speed, say forty or fifty miles per hour, and in limited toe-in relation at low speeds.

If the toe-in factor happened to be the only condition to be considered, the conventionally known scuff boards might function satisfactorily in indication of wheel alignment conditions. However, the wheels have camber slant also, as well as toe-in, as aforesaid, and scuff boards necessarily are affected by the camber slant. Cambered wheels do in fact gather a static tension to each other when rolling forward, and this tension would be discharged onto the scuff boards and would move them laterally in one direction or the other even though the toe-in was properly set. Under these conditions an operator, using conventionally known scuff boards, would not know what condition caused lateral deflection of the boards. In other words, was the board or were the boards moved laterally due to camber tension, or toe-in? Using such conventionally known scuff boards, the operator would now make the common mistake of adjusting the tie rod to change the toe-in in one way or the other until he obtained a zero reading on the scuff boards. It will be obvious, however, that when the wheels are thus toed-in or out in order to balance out the camber roll when using such scuff boards, the wheels are thus misaligned in a manner which would result in the imparting of a forward thrust on the scuff boards should the so adjusted wheels be rolled thereover, but since such known boards are incapable of indicating forward thrust, and since wheels so adjusted would not deflect the boards laterally, a zero or satisfactory reading would result despite the misalignment of the wheels. It is a purpose of the present invention to provide a scuff board structure on which such false readings cannot be obtained.

In its more detailed nature the invention resides in providing a novel scuff board structure, usable in pairs, and including a base or support having a run on ramp and a run off ramp, a scuff board supported on the base between the ramps and on anti-friction means so as to be free to move forwardly or laterally, or both forwardly and laterally, with wheel portions supported thereon, and means for indicating to an operator the movement of the scuff board.

Another object of the invention is to provide a scuff board structure of the character stated wherein there is included a single fluid pressure operated indicator for indicating movement of the scuff board whether said movement be forward, lateral or both.

Another object of the invention is to provide a scuff board structure of the character stated wherein provision is made for pivotally and slidably mounting the scuff board at its advance or wheel receiving end, and for permitting limited lateral deflection of the scuff board at its delivery end.

With the above and other objects in view that will hereinafter appear, the nature of the invention will be more clearly understood by reference to the following detailed description, the appended claims and the several views illustrated in the accompanying drawing.

In the drawings:

Figure 1 is a perspective view showing a pair of the improved scuff board structures mounted for use in testing wheel alignment.

Figure 2 is a plan view of the base per se.

Figure 3 is a vertical central longitudinal section through a scuff board structure.

Figure 4 is an enlarged detail vertical cross section taken on the line 4—4 on Figure 3.

Figure 5 is an enlarged fragmentary vertical central longitudinal section illustrating the gage actuator unit.

In the example of embodiment of the invention herein disclosed, two scuff board structures generally designated A are shown in parallel spaced relation in position for receiving the steering wheels of an automobile rolled thereonto, both structures being connected through fluid ducts B with a common indicator gage C.

Each of the improved scuff board structures generally designated A includes a base 5 having a run on or wheel receiving ramp 6 and a run off or wheel delivering ramp 7, a scuff board receiving recess or depression 8 being provided between said ramps. A scuff board 9 is mounted on the base between the ramps 6 and 7, and it will be apparent that the length of said board is so determined with relation to the ramps between which the board is mounted as to allow freedom for longitudinal or forward and rearward movements of said board.

The scuff board 9 is freely movable over support ball bearings 10 which are confined in longitudinally disposed troughs 11 on the base 5, and the balls may be spaced within said troughs by suitable distance pieces or spacers 12.

At its receiving end the scuff board 9 is provided with a depending pin 13 which engages in a central longitudinally disposed slot 14 formed in the base, and the board is normally held in its rearward position with the pin 13 in the rear end of the slot 14 through the medium of a retractile spring 15 which is anchored as at 16 to the ramp 6. At the delivery end the base depression is provided with a clearance slot 17, and a pin 18 depends from the scuff board 9 in position for being movable in the slot 17. It will be apparent that the pin and slot connection 13, 14 at the receiving end of the scuff board confines the board to a limited amount of forward and rearward movement, whereas the pin and slot connection 18, 17 at the delivery end of the structure confines the board to a limited amount of lateral and forward and rearward movement. The delivery end extremity of the scuff board 9 also is provided with a V-shaped slot 19, the purpose of which will be described hereinafter.

A recess 20 is formed in the rear face of the delivery ramp 7, and in this recess is mounted a half cylindrical casing 21. The casing is closed by a cap 22 which is removably secured thereon as at 23, and the cap is also removably secured as at 24 to the rear wall of the delivery ramp 7. The closure cap 22 also is provided with a central aperture 25 and serves to securely clamp a diaphragm 26 over the chamber provided within the casing and wherein a pressure liquid column 27 is trapped. The pressure liquid trapped in the chamber partly defined by the diaphragm 26 also fills individual ducts 28 and 29, one said duct leading from each of the scuff board structures and being attached to a T 30 which is secured as at 31 to a wall or other support and has one leg thereof opening into a glass indicator tube 32 equipped with suitable scale means 33 which is effective to indicate a rise or fall of the liquid column within the tube 32.

Interposed between each diaphragm 26 and closure cap 22 is a flat disk 34 having a stem or plunger 35 projecting centrally therefrom through the respective cap aperture 25, and each plunger is equipped with a head 36 which engages with the respective scuff board in the bottom of the V-shaped slot 19 formed in the end extremity thereof. A compression spring 37 mounted in each casing 21 constantly tends to press the respective diaphragm against the respective disk 34, and the disk against the respective closure cap 22.

It will be readily apparent that upon the rolling of the steering wheels of an automobile onto a pair of scuff boards arranged in the manner illustrated in Figure 1, any misalignment of the wheels will cause one or both boards to be deflected or displaced laterally or forwardly, or both laterally and forwardly according to the nature of the misalignment. Any straight forward movement of a scuff board will project the respective disk 34 forwardly without tilting the same, and any lateral deflection of a scuff board will result in a tilting of the respective disk 34. It will be apparent that any tilting or straight forward movement of a disk 34 will displace the respective diaphragm 26 in a manner for displacing liquid from the casing and the connecting duct or ducts so as to move the column of liquid in the tube 32 and give an indication of the degree of deflection or displacement of the scuff board. It will also be apparent that movement of either or both scuff boards of a cooperating pair will provide a reading on the tube scale.

It will be obvious that instead of providing a single gage C connected with two boards as shown in Figure 1 gages connected individually with one or two boards could be employed, and each such gage would give a reading indicating the condition of an individual wheel.

While one form of the invention has been shown for purposes of illustration, it is to be clearly understood that various changes in the details of construction and arrangement of parts may be made without departing from the spirit and scope of the invention as defined in the appended claims.

I claim:

1. A scuff board structure comprising a base having a wheel receiving portion and a wheel discharging portion, a unitary longitudinal scuff board supported on said base between said receiving and discharging portions and of a width for receiving thereon a single wheel and being free at one end thereof to move laterally or forwardly or both laterally and forwardly, antifriction means interposed directly between said scuff board and base and supporting the board on the base and means at the other end of the scuff board for confining the scuff board against lateral movement at said other end while permitting a limited amount of forward movement.

2. A scuff board structure comprising a base having a wheel receiving portion and a wheel discharging portion, a unitary longitudinal scuff board supported on said base between said receiving and discharging portions and of a width for receiving thereon a single wheel and being free at one end thereof to move laterally or forwardly or both laterally and forwardly, anti-friction means interposed directly between said scuff board and base and supporting the board on the base, means at the other end of the scuff board for confining the scuff board against lateral movement at said other end while permitting a limited amount of forward movement, and means engaged by said first mentioned free end of the board and operable by lateral or forward movement of said free end of the scuff board for indicating said lateral or forward movement of the scuff board on the base.

3. A scuff board structure comprising a base having a wheel receiving portion and a wheel discharging portion, a unitary longitudinal scuff board supported on said base between said receiving and discharging portions and of a width for receiving thereon a single wheel and being free at one end thereof to move laterally or forwardly or both laterally and forwardly, anti-friction means interposed directly between said scuff board and base and supporting the board on the base, means at the other end of the scuff board for confining the scuff board against lateral movement at said other end while permitting a limited amount of forward movement, and a single means operable by lateral or forward movement, or by any combination of lateral and forward movement of said first mentioned free end of the scuff board for indicating said lateral or forward or both lateral and forward movement of the scuff board on the base.

4. A scuff board structure comprising a base having a wheel receiving portion and a wheel discharging portion, a unitary longitudinal scuff board supported on said base between said receiving and discharging portions and being free at at least one end thereof to move laterally or forwardly or both laterally and forwardly, anti-friction means supporting the board on the base, means for confining the scuff board against inadvertent displacement from the base, and a single means operable by lateral or forward movement of the scuff board for indicating said lateral or forward or both lateral and forward movement of the scuff board on the base, said indicating means including a casing mounted on the base, a gage tube disposed remotely with respect to the base and connected by a duct with the interior of the casing, a column of liquid in said tube, duct and casing, a diaphragm in the casing and forming a closure wall against said liquid column, and a plunger engaged with the diaphragm and with the scuff board so that movement of the scuff board in a forward direction or a lateral direction or in any combination forward and lateral direction will cause movement of said liquid column and a variation in the height of the liquid column in the gage tube.

5. A scuff board structure comprising a base having a wheel receiving portion and a wheel discharging portion, a unitary longitudinal scuff board supported on said base between said receiving and discharging portions and being free at at least one end thereof to move laterally or forwardly or both laterally and forwardly, anti-friction means supporting the board on the base, means for confining the scuff board against inadvertent displacement from the base, and a single means operable by lateral or forward movement of the scuff board for indicating said lateral or forward or both lateral and forward movement of the scuff board on the base, said indicating means including a casing mounted on the base, a gage tube disposed remotely with respect to the base and connected by a duct with the interior of the casing, a column of liquid in said tube, duct and casing, said casing including a closure wall facing toward the delivery end of the scuff board, a diaphragm opposing said wall and in part defining a chamber confining the liquid column, a compression spring in said casing and constantly tending to press the diaphragm against said wall, a flat disk interposed between the diaphragm and closure wall and yieldably held against said wall by pressure of said diaphragm and spring while being permitted freedom to move bodily or tiltably to displace liquid from the casing by displacement of the diaphragm, and a plunger projecting from the disk through an aperture in the closure wall and engaging with the delivery end of the scuff board to be moved thereby as the scuff board moves laterally, forwardly or laterally and forwardly.

6. A scuff board structure comprising a base having a wheel receiving ramp and a wheel discharging ramp and an intervening scuff board receiving recess, a unitary longitudinal scuff board mounted in said recess with clearance to move forwardly and rearwardly therein and being of a width for receiving a single wheel thereon, anti-friction means directly interposed between the base and the board and supporting the board in said recess, slot and pin means confining the receiving end of the scuff board against lateral movement while permitting a limited amount of rectilinear forward and rearward movement, and slot and recess means for confining the delivery end of the scuff board to a limited amount of lateral and forward and rearward movement.

7. A scuff board structure comprising a base having a wheel receiving ramp and a wheel discharging ramp and an intervening scuff board receiving recess, a unitary longitudinal scuff board mounted in said recess with clearance to move forwardly and rearwardly therein and being of a width for receiving a single wheel thereon, anti-friction means directly interposed between the base and the board and supporting the board in said recess, slot and pin means confining the receiving end of the scuff board against lateral movement while permitting a limited amount of rectilinear forward and rearward movement, slot and recess means for confining the delivery end of the scuff board to a limited amount of lateral and forward and rearward movement, and means operable by engagement of the end of the board which is permitted the limited amount of lateral and forward and rearward movement for indicating movements of the scuff board laterally or forwardly or both laterally and forwardly.

8. A scuff board structure comprising a base having a wheel receiving ramp and a wheel discharging ramp and an intervening scuff board receiving recess, a unitary scuff board mounted in said recess with clearance to move forwardly and rearwardly therein, anti-friction means supporting the board in said recess, means confining the receiving end of the scuff board to a limited amount of rectilinear forward and rearward movement, means for confining the delivery end of the scuff board to a limited amount of lateral and forward and rearward movement, and means operable by board movements for indicating movements of the scuff board laterally or forwardly or both laterally and forwardly, said indicating means including a casing mounted on the base, a gage tube disposed remotely with respect to the base and connected by a duct with the interior of the casing, a column of liquid in said tube, duct and casing, said casing including a closure wall facing toward the delivery end of the scuff board, a diaphragm opposing said wall and in part defining a chamber confining the liquid column, a compression spring in said casing and constantly tending to press the diaphragm against said wall, a flat disk interposed between the diaphragm and closure wall and yieldably held against said wall by pressure of said diaphragm and spring while being permitted freedom to move bodily or tiltably to displace liquid from the casing by displacement of the diaphragm, and a plunger projecting from the disk through an aperture in the closure wall and engaging with the delivery end of the scuff board to be moved thereby as the scuff board moves laterally, forwardly or laterally and forwardly.

EDWARD D. WILKERSON.

References Cited in the file of this patent

UNITED STATES PATENTS

| Number | Name | Date |
|---|---|---|
| 1,487,759 | Skinner | Mar. 25, 1924 |
| 1,988,327 | Musselman | Jan. 15, 1935 |
| 2,003,912 | Weaver | June 4, 1935 |
| 2,007,565 | Duby | July 9, 1935 |
| 2,012,142 | Shroyer | Aug. 20, 1935 |
| 2,203,136 | Fowler | June 4, 1940 |
| 2,235,279 | Bunker | Mar. 18, 1941 |

FOREIGN PATENTS

| Number | Country | Date |
|---|---|---|
| 751,469 | France | June 19, 1933 |